United States Patent Office 3,206,502
Patented Sept. 14, 1965

3,206,502
2-SEC.-BUTENYL PHENYL N-METHYL CARBAMATE AND 2 - SEC. BUTENYL - 4 - METHYL PHENYL N-METHYL CARBAMATE
Rudolf Heiss and Ernst Böcker, Cologne-Stammheim, and Günter Unterstenhöfer, Opladen, Germany, assignors to Farbenfabriken Bayer Aktiengesellschaft, Leverkusen, Germany, a German corporation
No Drawing. Filed Feb. 27, 1962, Ser. No. 176,123
Claims priority, application Germany, Mar. 21, 1961,
F 33,466
3 Claims. (Cl. 260—479)

The present invention relates to and has as its objects new and useful insecticidally active carbamic acid esters of the general formula

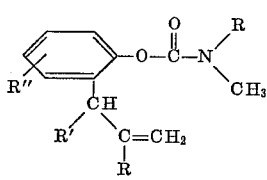

in which R stands for hydrogen or methyl, R' for hydrogen or a lower alkyl radical, R" for hydrogen, halogen, an alkyl-, alkoxy-, alkylmercapto- or an alkylamino-group, and processes for the production thereof.

These new compounds in accordance with this invention may be prepared according to methods known in principle, for example, either by reaction of the appropriately substituted phenols with methyl isocyanate or methyl- or dimethyl carbamic acid halides, or from corresponding amines with corresponding chloroformic acid phenyl esters or carbonic acid-bis-phenyl esters, or from corresponding phenols and N-methyl- or N,N-dimethylphenyl carbamate. The following reaction schemes may illustrate some of these possibilities of preparing the new inventive compounds:

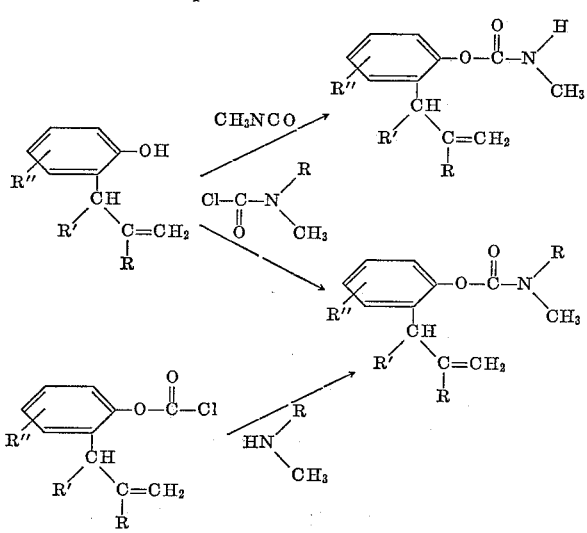

The new compounds according to the invention show very good insecticidal properties, as can be seen from the following tables.

(a) 2-sec.-butenylphenyl-N-methyl carbamate:

| Conc. in percent (aqueous emulsion) | Killing in percent Plutella maculipennis | Drosophila | Aphids | Syst. action on S. granarium |
|---|---|---|---|---|
| 0.2 | 100 | 100 | 100 | 100 |
| 0.02 | 90 | 100 | 100 | |
| 0.002 | 20 | 60 | 95 | |

| Conc. in percent (aqueous emulsion) | Cockroaches | Rapacious bugs | Weevils | Fly larvae |
|---|---|---|---|---|
| 0.1 | 100 | 100 | 100 | 100 |
| 0.01 | 100 | 100 | 80 | 0 |

| Conc. in percent (aqueous emulsion) | 100% killing of— | |
|---|---|---|
| | Flies | Mosquitoes |
| 0.1 | After 15 minutes | After 60 minutes. |
| 0.01 | After 70 minutes | After 120 minutes. |

The aqueous emulsions were prepared by admixing the active ingredient with the same amount of dimethyl-formamide (auxiliary solvent) and nonylphenolpolyglycol ether (commercial NP10, emulsifier) and diluting this mixture to the concentrations indicated above.

Example 1

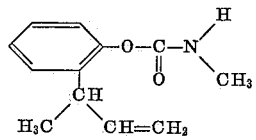

14.8 grams (0.1 mol) of 2-sec.-butenyl phenol are dissolved in a little anhydrous xylene and treated with 6.3 grams (0.11 mol) of methyl isocyanate. Upon addition of 3 drops of triethyl amine violent reaction occurs under evolution of heat. After standing for 1 day the solution is washed with water, subsequently dried with sodium sulfate and the solvent distilled off in a vacuum. 17 grams (83% of the theoretical) of analytically pure carbamate of M.P. 42–43° C. are obtained.

The preparation of the above mentioned carbamate can also be carried out by reaction of 2-sec.-butenyl phenol with methyl carbamic acid chloride or by reaction of the 2-sec.-butenyl phenyl chloroformic acid ester with methyl amine:

14.8 grams (0.1 mol) of 2-sec.-butenyl phenol are dissolved in 60 ml. of benzene and treated with 9.4 grams (0.1 mol) of methyl carbamic acid chloride and 10.1 grams (0.1 mol) of triethyl amine are added. The reaction mixture is boiled under reflux. After cooling down the precipitated salt is filtered off and the benzene distilled off. For purification, the carbamate can be recrystallized from ligroin.

To a solution of 27.6 grams (0.2 mol) of potassium carbonate and 3.1 grams (0.1 mol) of methylamine in 60 ml. of water there are added dropwise with stirring at 5–10° C. 21 grams (0.1 mol) of 2-sec.-butenyl phenyl chloroformic acid ester. The reaction mixture is subsequently stirred for another 1–2 hours at room temperature. The carbamate is filtered off. It results in a pure state.

Example 2

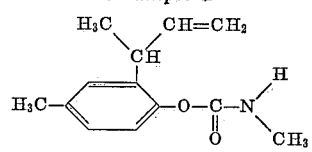

25 grams (0.15 mol) of 2-sec.-butenyl-4-methyl phenol are stirred with 9.7 grams (0.17 mol) of methyl isocyanate and about 10 ml. of anhydrous xylene. After the addition of 3 drops of triethyl amine the reaction mixture warms up. The resulting carbamate is dissolved in benzene and the solution is washed twice with water. After drying the solution with sodium sulfate the benzene is distilled off in vacuum. Yield 28.3 grams (88% of the theoretical). Melting point 38–40° C.

55 grams (0.55 mol) of phosgene are introduced into a mixture of 162 grams (1 mol) of 2-sec.-butenyl-4-methyl phenol, 175 ml. of water and 100 ml. of benzene. The reaction solution is maintained alkaline by the simultaneous dropwise addition of 98 grams of 45% sodium hydroxide. After the termination of the reaction another small quantity of phosgene is introduced so that the solution reacts weakly acid. The benzene layer is separated from the aqueous layer, diluted with 150 ml. of benzene and 107 ml. of 29.2% solution of methylamine are added dropwise at 5–10° C. Stirring is continued for 4 hours, followed by extraction with 500 ml. of 2 N NaOH and another washing of the benzene layer with water. The solvent is distilled off and the product of the reaction recrystallized from ligroin.

The 2-sec.-butenyl-4-methyl phenyl-N-methyl carbamate can also be obtained by transesterification of 2-sec.-butenyl-4-methyl phenol with phenyl-N-methyl carbamate.

*Example 3*

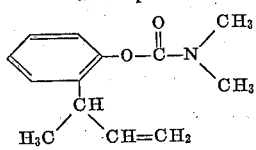

14.8 grams (0.1 mol) of 2-sec.-butenyl-phenol are dissolved in 60 ml. of benzene, treated with 10.8 grams (0.1 mol) of dimethyl carbamic acid chloride and 10.1 grams (0.1 mol) of triethyl amine and boiled under reflux. After the reaction is terminated, working up is carried out as usually.

By the same way there may be obtained the compounds of the following formulae:

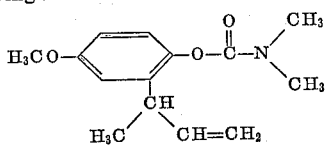

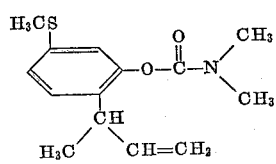

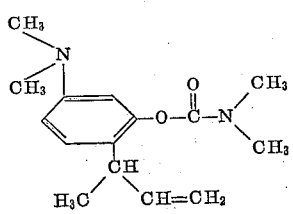

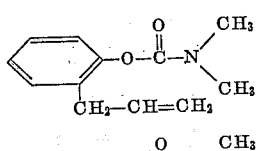

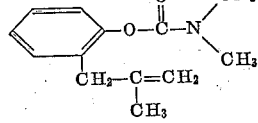

*Example 4*

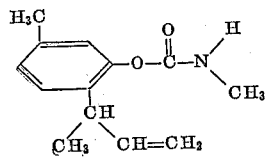

16.2 grams (0.1 mol) of 2-sec.-butenyl-5-methyl phenol are dissolved in anyhydrous xylene and reacted with 6.3 grams (0.11 mol) of methyl isocyanate with the addition of 3 drops of triethyl amine. After the termination of the reaction the solution is washed with water, dried over sodium sulfate and the xylene is subsequently distilled off in a vacuum. 18.4 grams of pure carbamate are obtained.

*Example 5*

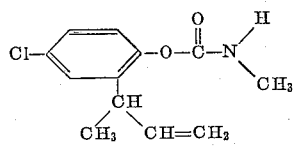

18.3 grams (0.1 mol) of 2-sec.-butenyl-4-chlorophenol are reacted with 6.3 grams (0.11 mol) of methyl isocyanate in anhydrous xylene with the addition of 3 drops of triethyl amine. The reaction mixture is worked up as indicated in Example 4.

By the same way there may be obtained the compound of the following formula

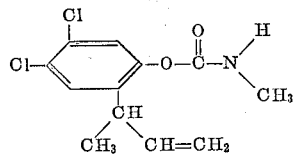

We claim:
1. A compound of the formula

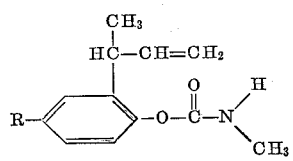

in which R is a member selected from the group consisting of hydrogen and methyl.

2. A compound of the formula

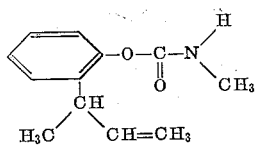

3. A compound of the formula

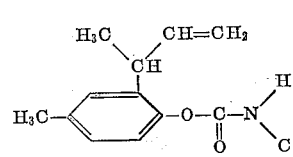

References Cited by the Examiner

UNITED STATES PATENTS 1,252,452   1/18   Kropp ---------------- 260—479
3,062,865   11/62  Moore et al ---------- 260—479

OTHER REFERENCES

Harvill et al.: Contributions from Boyce Thompson Institute, vol. 13, No. 2, pages 79–86 (April–June 1943).

LORRAINE A. WEINBERGER, *Primary Examiner.*

A. LOUIS MONOCELL, LEON ZITVER, *Examiners.*